No. 878,031. PATENTED FEB. 4, 1908.
F. L. ADAMS.
JOURNAL BEARING.
APPLICATION FILED APR. 6, 1907.
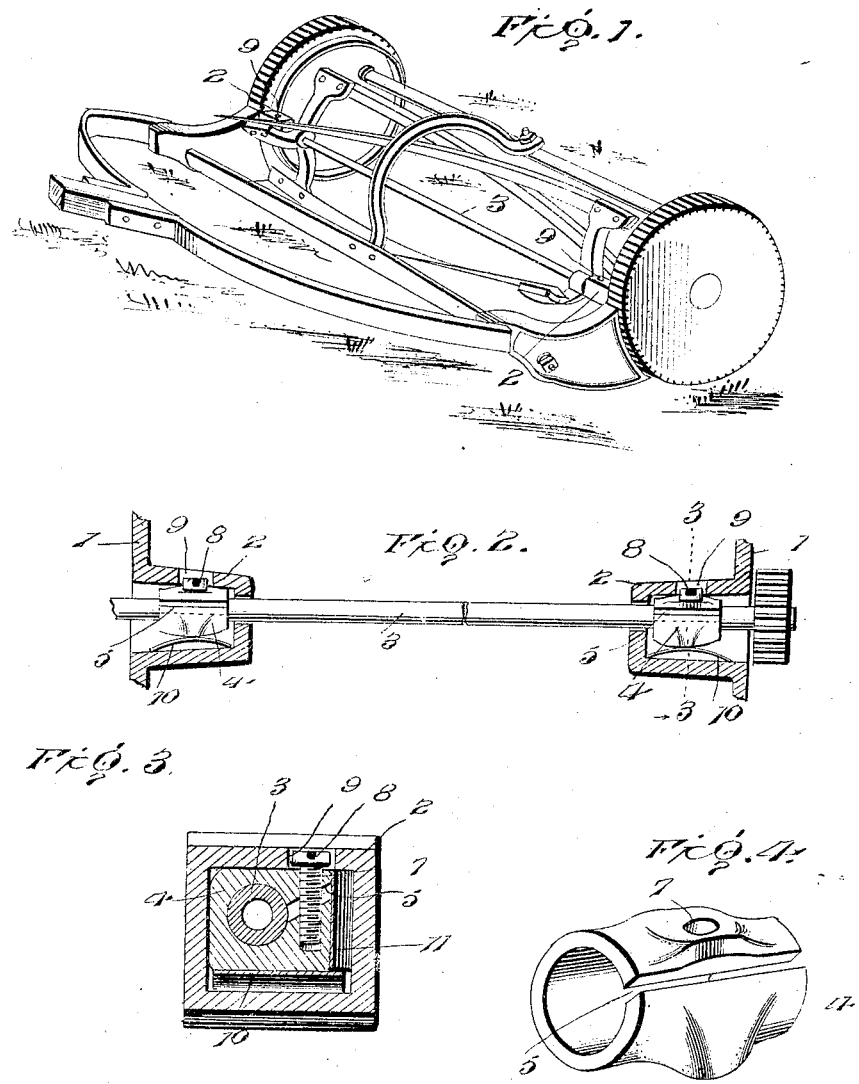
Inventor
Fred L Adams.
Witnesses

UNITED STATES PATENT OFFICE.

FRED L. ADAMS, OF PROPHETSTOWN, ILLINOIS.

JOURNAL-BEARING.

No. 878,031.

Specification of Letters Patent.

Patented Feb. 4, 1908.

Application filed April 6, 1907. Serial No. 366,761.

*To all whom it may concern:*

Be it known that I, FRED L. ADAMS, citizen of the United States, residing at Prophetstown, in the county of Whiteside and State of Illinois, have invented certain new and useful Improvements in Journal-Bearings, of which the following is a specification.

This invention contemplates certain new and useful improvements in journal bearings or boxes, and relates particularly to an improved construction of bearing for the reel shaft of a lawn mower.

The invention has for its object an improved bearing, the construction and arrangement of which will prevent the bearing block from rolling or turning over in the journal box, and further objects are to provide springs so arranged as to hold the block rigidly in place and yet permit sufficient freedom for the block to adjust itself to alinement with the shaft.

With this and other objects in view as will more fully appear as the description proceeds, the invention consists in certain constructions, arrangements and combinations of the parts which I shall now hereinafter fully describe and then point out the novel features in the appended claims.

For a full description of the invention and the merits thereof and also to acquire a knowledge of the details of construction of the means for effecting the result, reference is to be had to the following description and accompanying drawings, in which:

Figure 1 is a perspective view of a lawn mower provided with my improved journal bearings for the reel shaft. Fig. 2 is a longitudinal sectional view of both boxes with the shaft journaled therein. Fig. 3 is a transverse sectional view, on an enlarged scale, the section being taken on the line 3—3 of Fig. 2. Fig. 4 is a detail perspective view of one of the bearing blocks.

Corresponding and like parts are referred to in the following description and indicated in all the views of the drawings by the same reference characters.

Referring to the drawings, the numeral 1 designates the side plates or heads of a lawn mower to which my invention is applied, said heads being formed with preferably integral journal boxes 2 extending inwardly, and each formed with a substantially rectangular chamber to receive the bearing block.

3 designates the reel shaft which extends into and projects through the boxes.

My improved bearing block 4 which is adapted to encircle the ends of the shaft 3, is provided with a circular bore to receive the shaft and is split by means of the formation of a longitudinal opening 5 therein, the opening extending throughout its length. The block 4 is rectangular and substantially square in cross section at its middle, and tapers, with a rounded formation, towards the ends. The opening 5 is preferably oblique to the horizontal plane of the block, as best seen in Fig. 3. The block 4 is formed with a socket 7, intersecting the opening 5, and a tension screw 8 is intended to work in said opening, said screw being inserted through an aperture 9 formed in the upper wall of the box 2.

10 and 11 designate springs which are preferably of the leaf variety, and which are interposed between two adjacent walls of the box and the block, preferably the lower and rear walls, and the function of these springs is to hold the block rigidly in place and yet in a sufficiently yielding manner as to permit it to adjust itself to alinement with the shaft 3. By means of the tension screw 8, the block may be closed or drawn together so as to fit the shaft and compensate for any wear.

From the foregoing description in connection with the accompanying drawings, it will be seen that by means of the springs 10 and 11, the block will be held firmly against the walls of the box opposite said springs and thereby prevent any shake or shifting of the block or bearing, while the tapered formation of the block with its square middle portion, insures that the block will be held firmly in the box and yet be permitted to rock, to adjust itself to the shaft without any possibility of its rolling or turning over in the journal box.

Having thus described the invention, what is claimed as new is:

1. The combination with a journal box formed with a substantially rectangular chamber, means for supporting said box, and a shaft extending into said box, of a bearing block encircling the shaft and fitting in said box, and springs interposed between two adjacent walls of said chamber and the block, as and for the purpose set forth.

2. The combination with a journal box provided with a substantially rectangular chamber, means for supporting said box, and a shaft extending into the box, of a block encircling the shaft and fitting within said chamber, said block being square in cross section at its middle and tapering and rounding towards each end, and springs interposed between two adjacent walls of the chamber and the block, and adapted to force said block against the two opposite walls.

In testimony whereof I affix my signature in presence of two witnesses.

FRED L. ADAMS. [L. S.]

Witnesses:
D. H. ELLISON,
F. D. ANGELL.